United States Patent
Gupta et al.

(10) Patent No.: US 9,985,843 B2
(45) Date of Patent: *May 29, 2018

(54) EFFICIENT PARALLEL PROCESSING OF A NETWORK WITH CONFLICT CONSTRAINTS BETWEEN NODES

(71) Applicant: International Business Machines Corporation, Armonk, NY (US)

(72) Inventors: Hemlata Gupta, Hopewell Junction, NY (US); David J. Hathaway, Underhill, VT (US); Kerim Kalafala, Rhinebeck, NY (US); Ronald D. Rose, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 339 days.

This patent is subject to a terminal disclaimer.

(21) Appl. No.: 14/633,273

(22) Filed: Feb. 27, 2015

(65) Prior Publication Data
US 2016/0255136 A1 Sep. 1, 2016

(51) Int. Cl.
*G06F 15/16* (2006.01)
*H04L 12/24* (2006.01)
*G06F 9/50* (2006.01)
*H04L 12/26* (2006.01)

(52) U.S. Cl.
CPC ............ *H04L 41/14* (2013.01); *G06F 9/5038* (2013.01); *G06F 9/5083* (2013.01); *H04L 43/08* (2013.01)

(58) Field of Classification Search
CPC ...... H04L 67/10; H04L 41/5003; H04L 41/14
USPC .................. 709/201, 229, 231, 234
See application file for complete search history.

(56) References Cited

U.S. PATENT DOCUMENTS 5,508,937 A 4/1996 Abato et al.
5,729,468 A 3/1998 Cox
(Continued)

FOREIGN PATENT DOCUMENTS

WO 2015012709 A2 1/2015

OTHER PUBLICATIONS

IBM, "List of IBM Patents or Patent Applications Treated as Related (Appendix P)," Nov. 3, 2016, p. 1-2.
(Continued)

*Primary Examiner* — Phuoc Nguyen
(74) *Attorney, Agent, or Firm* — Robert C. Bunker

(57) ABSTRACT

According to one exemplary embodiment, a method for parallel processing a network of nodes having at least one ordering constraint and at least one conflict constraint is provided. The method may include breaking a plurality of loops caused by the at least one ordering constraint. The method may also include determining a node order based on the at least one ordering constraint. The method may then include determining a conflict order based on the at least one conflict constraint, whereby no new loops are created in the network. The method may further include performing parallel processing of the network of nodes based on the node order and the conflict order.

20 Claims, 9 Drawing Sheets

(56) References Cited

U.S. PATENT DOCUMENTS

| | | | |
|---|---|---|---|
| 6,026,092 | A | 2/2000 | Abu-Amara et al. |
| 6,202,192 | B1 | 3/2001 | Donath et al. |
| 6,332,160 | B1 | 12/2001 | Tabuchi |
| 6,507,937 | B1 | 1/2003 | Tetelbaum |
| 6,529,934 | B1 | 3/2003 | Kawamura et al. |
| 7,516,455 | B2 | 4/2009 | Matheson et al. |
| 7,769,727 | B2 | 8/2010 | Sivapragasam et al. |
| 8,024,683 | B2 | 9/2011 | Darsow et al. |
| 9,495,218 | B2 | 11/2016 | Gupta et al. |
| 2002/0016845 | A1* | 2/2002 | Palmer .................. H04L 67/10 709/229 |
| 2006/0271888 | A1 | 11/2006 | Meuris et al. |
| 2007/0011668 | A1 | 1/2007 | Wholey et al. |
| 2009/0119632 | A1 | 5/2009 | Kano et al. |
| 2011/0140745 | A1 | 6/2011 | Buck et al. |
| 2012/0207018 | A1 | 8/2012 | Goldenberg et al. |
| 2013/0086017 | A1 | 4/2013 | Chao et al. |
| 2014/0046997 | A1* | 2/2014 | Dain .................. H04L 67/2861 709/201 |
| 2015/0043383 | A1 | 2/2015 | Farkas et al. |
| 2016/0253214 | A1 | 9/2016 | Gupta et al. |
| 2016/0380839 | A1 | 12/2016 | Gupta et al. |

OTHER PUBLICATIONS

Gupta et al., "Efficient Parallel Processing of a Network With Conflict Constraints Between Nodes," Application and Drawings, filed Sep. 16, 2016, 34 Pages, U.S. Appl. No. 15/267,166.

IBM, "List of IBM Patents or Patent Applications Treated as Related (Appendix P)," Jun. 7, 2016, p. 1-2.

Gupta et al., "Efficient Parallel Processing of a Network With Conflict Constraints Between Nodes," Application and Drawings, filed Feb. 17, 2016, 34 Pages, U.S. Appl. No. 15/045/727.

Gupta et al., "Efficient Parallel Processing of a Network With Conflict Constraints Between Nodes," Application and Drawings, filed Jan. 10, 2017, 34 Pages, U.S. Appl. No. 15/402,596.

Adam et al., "A Comparison of List Schedules for Parallel Processing Systems," Computer Systems, Dec. 1974, p. 685-690, Communications of the ACM, vol. 17, No. 12.

Mell et al., "The NIST Definition of Cloud Computing," National Institute of Standards and Technology, Information Technology Laboratory, Oct. 7, 2009, Version 15.

Sotskov et al., "Scheduling problems and mixed graph colorings," Optimization: A Journal of Mathematical Programming and Operations Research, 2002, p. 1-27, vol. 51, Issue 3.

* cited by examiner

EFFICIENT PARALLEL PROCESSING OF A NETWORK WITH CONFLICT CONSTRAINTS BETWEEN NODES

BACKGROUND

The present invention relates generally to the field of computing, and more particularly to processing networks with conflict constraints between nodes.

Circuit analysis techniques are employed to determine if a circuit meets predefined specifications. Processing a large network with nodes is a computationally expensive task, taxing compute resources. Many types of large network processing may be done by processing each node within the network. Static timing analysis computes the arrival time for each node of the network. Static noise analysis computes noise pulse and/or delta delay for each sink of each net in the network.

SUMMARY

According to one exemplary embodiment, a method for parallel processing a network of nodes having at least one ordering constraint and at least one conflict constraint is provided. The method may include breaking a plurality of loops caused by the at least one ordering constraint. The method may also include determining a node order based on the at least one ordering constraint. The method may then include determining a conflict order based on the at least one conflict constraint, whereby no new loops are created in the network. The method may further include performing parallel processing of the network of nodes based on the node order and the conflict order.

According to another exemplary embodiment, a computer system for parallel processing a network of nodes having at least one ordering constraint and at least one conflict constraint is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include breaking a plurality of loops caused by the at least one ordering constraint. The method may also include determining a node order based on the at least one ordering constraint. The method may then include determining a conflict order based on the at least one conflict constraint, whereby no new loops are created in the network. The method may further include performing parallel processing of the network of nodes based on the node order and the conflict order.

According to yet another exemplary embodiment, a computer program product for parallel processing a network of nodes having at least one ordering constraint and at least one conflict constraint is provided. The computer program product may include one or more computer-readable storage devices and program instructions stored on at least one of the one or more tangible storage devices, the program instructions executable by a processor. The computer program product may include program instructions to break a plurality of loops caused by the at least one ordering constraint. The computer program product may also include program instructions to determine a node order based on the at least one ordering constraint. The computer program product may then include program instructions to determine a conflict order based on the at least one conflict constraint, whereby no new loops are created in the network. The computer program product may further include program instructions to perform parallel processing of the network of nodes based on the node order and the conflict order.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
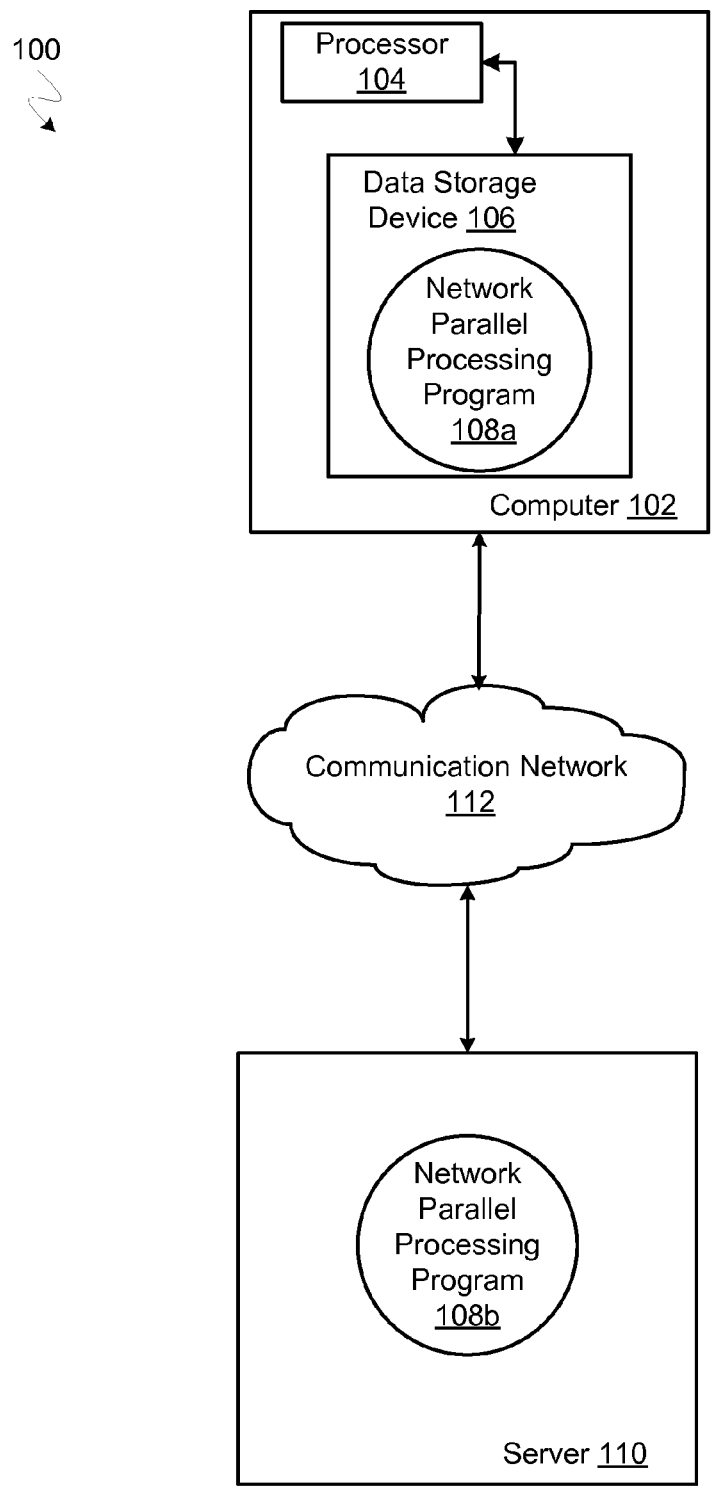
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for efficient parallel processing of a network with conflict constraints between nodes. Additionally, the present embodiment has the capacity to improve the technical field of parallel network processing with conflict constraints between nodes by ordering conflict constraints such that no new loops are created in the network.

As previously described, analyzing large networks is computationally expensive. In order to improve network analysis efficiency, the network may be processed in parallel. Parallel processing may still be fraught with complexities in large networks since networks may have node ordering constraints. For example, the arrival time of a cell input may have to be computed before the cell output. Ordering constraints may create computation complexities due to loop formation (e.g., transparent latches in static timing analysis). Cyclic dependencies require loop cutting and iterative processing to obtain the most accurate answer. However, iteration and loop cutting may also significantly impact process efficiency. Although some pairs of nodes may not have an ordering requirement, the pair of nodes may create parallel processing conflicts when two nodes may access and update the same data (e.g., noise analysis between coupled nets). Similarly to loop cutting, conflicts may be processed by using iterations. For example, one end may be chosen to process first and a new iteration may be used if processing a second node causes changes that could affect the first node processed.

Therefore, it may be advantageous to, among other things, provide a way to efficiently manage parallel processing conflicts found in networks.

Efficient node ordering may handle conflicts effectively such that nodes are only processed when all predecessor nodes have already been processed. By ordering nodes in this manner, no new loops are created (reducing resources to iterate and reprocess nodes), nodes are processed with the latest data available (i.e., data is not stale), side copies of data are avoided that may cause added complexity and memory usage, and locking techniques may be avoided that may have significant drawbacks (e.g., hurt scaling, create deadlock, cause unpredictable results, etc.). The network to be analyzed may be represented, for example, as a mixed graph having nodes corresponding to nets, directed edges corresponding to cell input/output connections and undirected edges corresponding to coupling caps. According to at least one embodiment, managing parallel processing conflict constraints may include the steps of loop cutting, determining an ordering of nodes, order each conflict between a pair of nodes consistent with the determined ordering, and parallel processing the network according to the ordering constraint and conflict constraint.

First, cyclic dependencies within the graph representing the network may be eliminated using loop cutting techniques. Loops may be cut, as needed, considering only the ordering constraints (i.e., directed edges within a graph representation) using known techniques.

Next, an ordering of nodes may be determined. Ordering of nodes may be done by first determining a partial ordering based on the directed edges of the graph, and then determining a strict ordering between any pairs of conflicting nodes (i.e., nodes whose order was not determined by partial ordering).

Partial node ordering may be determined by annotating the nodes within the graph with additional information to allow any possible dependency by determining a series of ordering constraints (i.e., directed edges between nodes). Techniques for achieving partial ordering may include levelization or dependency hashing. Levelization may be implemented by assigning a level number value to each node, whereby the level number of the node is greater than or equal to the level numbers of the node's immediate predecessors (e.g., A cannot depend on B unless level(A) >level(B)). Dependency hashing may assign arbitrary bit strings to each primary node (i.e., a node with no predecessors). The bit string of successive nodes may then contain the bit strings of the successive node's predecessor nodes. For example, node A cannot depend on node B if any bit on B is also set on A (i.e., if bits(A) & ~bits(A) !=0).

The nodes of the graph may also given a strict (i.e., total) ordering. Strict node ordering may be used to determine a node ordering for conflicts whose ordering was not determined by partial node ordering while ensuring that no new loops are created as a result of strict node ordering.

According to at least one embodiment, implementation of strict ordering may be accomplished by assigning each node within the graph a name or pointer value (e.g., to the memory location storing the node). Then, the nodes may be arbitrarily ordered to resolve ambiguities based on the node's name or pointer value such that no possible dependency may be created. For example, a node with a smaller pointer value may be ordered before another node with a greater pointer value.

According to at least one other embodiment, strict ordering of nodes may be based on the estimated cost of processing the node. Conflicting nodes may be ordered by processing the node having the largest cost first. Processing the largest cost node first may reduce the likelihood of threads running out of nodes to process. Conflicting nodes may also be processed such that the node with the largest cost is processed last. By using the most up-to-date (i.e., least stale) information for the node that has the most dependencies, there may be less of a likelihood of having to reprocess the costly node later. The choice between processing the highest cost node first or last may be made based on the number of threads and nodes (i.e., average available parallelism) or the importance of getting the most accurate answers and if iterations will be employed. Additionally, estimating the processing cost of a node may include the share of the total cumulative cost of all downstream nodes.

According to yet another embodiment, strict ordering of nodes may be determined by the criticality of each node (i.e., the importance of getting the most accurate result). Thus, node conflicts may be ordered such that the most critical end may be processed last. Critical nodes may then be processed using the most up-to-date (i.e., least stale) information.

Then, each conflict between a pair of nodes may be ordered. Ordering conflicts between two nodes (i.e., assigning a direction to an undirected edge within a graph representation of the network) may be handled by following the partial ordering or by following the strict ordering determined previously. According to at least one embodiment, conflicts may be ordered according to the partial ordering if there may be a possible dependency between two nodes; otherwise the conflicts may be ordered consistent with strict ordering.

Once an order has been determined for the node conflicts, parallel processing of the nodes may commence consistent with the original ordering constraints and the order chosen for conflicting edges previously. Parallel processing may proceed using a known process, such as multi-threaded dynamic scheduling (MTDS).

Referring now to FIG. 1, an exemplary networked computer environment 100 in accordance with one embodiment is depicted. The networked computer environment 100 may include a computer 102 with a processor 104 and a data storage device 106 that is enabled to run a network parallel processing program 108a. The networked computer environment 100 may also include a server 110 that is enabled to run a network parallel processing program 108b and a communication network 112. The networked computer environment 100 may include a plurality of computers 102 and servers 110, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 110 via the communications network 112. The communications network 112 may include connections, such as wire, wireless communication links, or fiber optic cables. As will be discussed with reference to FIG. 4, server computer 110 may include internal components 902a and external components 904a, respectively and client computer 102 may include internal components 902b and external components 904b, respectively. Client computer 102 may be, for example, a mobile device, a telephone, a PDA, a netbook, a laptop computer, a tablet computer, a desktop computer, or any type of computing device capable of running a program and accessing a network.

A program, such as a network parallel processing program 108a and 108b may run on the client computer 102 or on the server computer 110. The network parallel processing program 108a and 108b may be used to efficiently process networks containing conflict constraints between nodes. The network parallel processing program 108a and 108b is explained in further detail below with respect to FIGS. 2A and 2B.

Figure 2A:
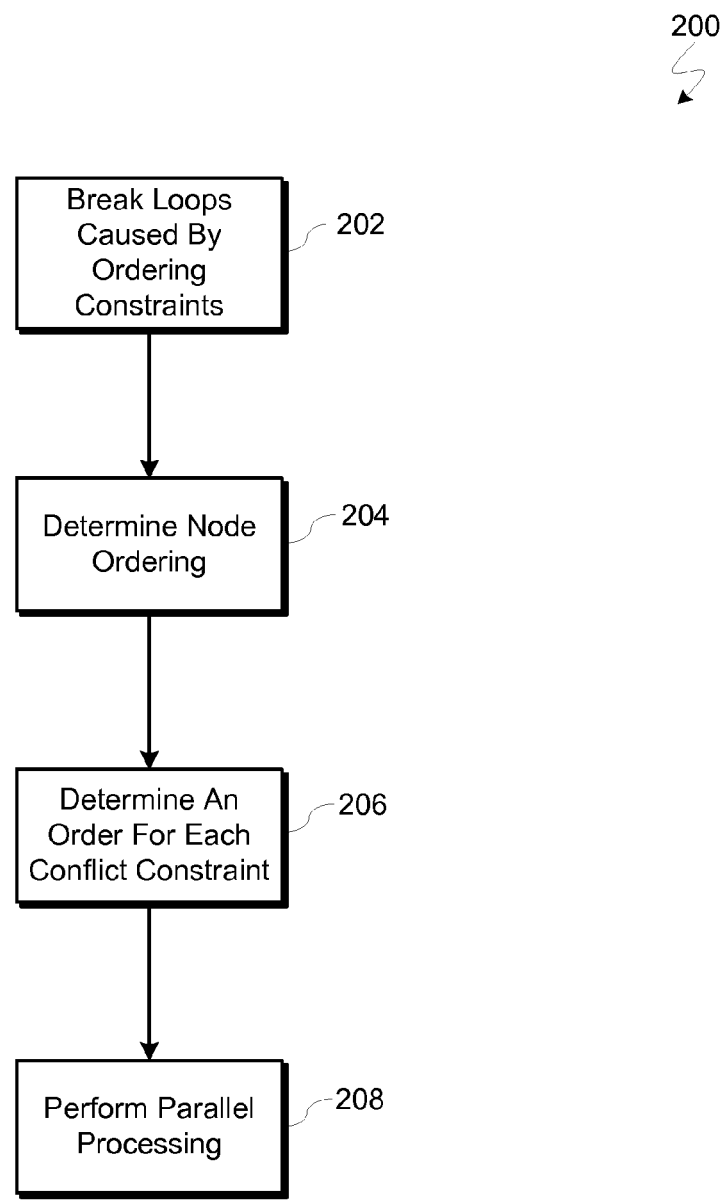
FIG. 2A is an operational flow chart illustrating a process for network parallel processing according to at least one embodiment.

Referring now to FIG. 2A, an operational flow chart illustrating the exemplary node ordering process 200 by the network parallel processing program 108a and 108b (FIG. 1) according to at least one embodiment is depicted.

At 202, the node ordering process 200 may break loops caused by ordering constraints within the network. According to at least one embodiment, the node ordering process 200 may determine loops (i.e., cyclic dependencies) exist within a network based on the ordering constraints. Ordering constraints may be determined by mapping the input and output connections of a node in the network. For example, in a cell network, a cell with an input and an output has an ordering constraint that indicates that the input must be processed before the output. A loop (i.e., cyclic dependency) may occur with a transparent latch in static timing analysis. Loop cutting may be performed by a known loop cutting algorithm.

Next, at 204, an ordering for the nodes in the network may be determined. Node ordering will be discussed in further detail below with respect to FIG. 2B.

Then, at 206 an order for each conflict constraint may be determined. Conflict constraints may be an undirected edge between two nodes within the graph representing the network. The conflict constraint may correspond to, for example, coupling capacitors in a circuit. According to at least one embodiment, the conflict constraints (i.e., undirected edges) may be given an order (i.e., undirected edges given a direction) between the two nodes (e.g., node A and node B). In cases when the two nodes connected to the conflict constraint edge were ordered previously as part of the partial ordering (e.g., using a levelization scheme) and the two nodes had a distinct order (e.g., node A was assigned level 3 and node B was assigned level 4), the conflict edge may be given a direction from lower ordered node to the higher ordered node (e.g., node A would be processed before node B). However, if the two nodes connected to the conflict edge were ambiguously ordered during partial ordering (e.g., node A and node B were both assigned level 3), then the conflict constraint edge may be given a direction from the lower ordered node to the higher ordered node based on the strict node order (e.g., based on node criticality).

At, 208, the nodes in the network may be processed in parallel based on the determined node order. According to at least one embodiment, parallel processing may be accomplished using a known method such as multi-threaded dynamic scheduling (MTDS).

Figure 2B:
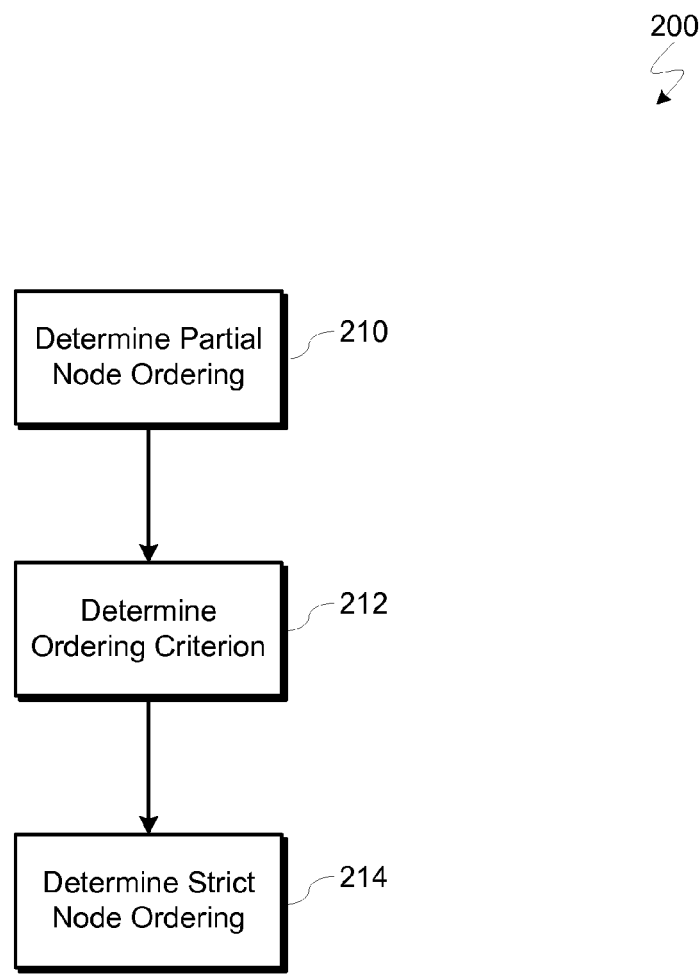
FIG. 2B is an operational flow chart illustrating a process for node ordering according to at least one embodiment.

Referring now to FIG. 2B, an operational flow chart illustrating in detail the exemplary node ordering steps of the node ordering process 200.

At 210, a partial node ordering may be determined. According to at least one embodiment, the nodes may be annotated with additional information to allow for any potential dependency through a series of ordering constraints. Partial ordering may result in nodes being ordered before or after other nodes and some nodes may still be ambiguous (e.g., between two nodes, which node should be ordered before the other node may not be determined). Annotation of nodes with additional information may be done through processes such as, for example, levelization or dependency hashing.

According to at least one implementation, levelization may be implemented by assigning a level value (e.g., a number) to each node such that a successor node (i.e., endpoint node) has a number that is greater than the level numbers of the nodes preceding the successor node. For example, a predecessor node may be assigned a level number of 3. The predecessor node's immediate successor node may then be assigned a level number of 4. With nodes assigned the level number according to a levelization scheme, node A cannot depend on node B unless the level assigned to A exceeds the level assigned to node B.

Alternatively, dependency hashing may be used to annotate nodes. Dependency hashing may be implemented by assigning an arbitrary bit string to each primary input node (i.e., node with no predecessor nodes) in the network. Each internal node (i.e., nodes having a predecessor node) may be assigned a bit string that may contain the bit string of the preceding nodes (i.e., the bit string for an internal node is OR of bit strings of the node's immediate predecessors). Once the nodes have been assigned bit strings according to the dependency hashing scheme, node A cannot depend on node B if any bit set on B is not also set on A (i.e., if bits(B) & ~bits(A) !=0).

After partial ordering, some nodes in the graph may not be completely ordered in relation to other nodes. For example, if a levelization scheme is used, two nodes may be at the same level in the graph (e.g., node A and node B are both assigned the level number 3). Thus, nodes preceding and succeeding the nodes may be ordered, however the two (or more) nodes having the same level value (e.g., node A and node B) may create an ambiguity as to which node would be processed first (i.e., tie between two or more nodes). Nodes with ambiguous ordering may be considered ambiguous nodes.

Next, at 212 ordering criterion for use in strict node ordering may be determined. Depending on the strict ordering scheme that will be used, different criterion for strict ordering may need to be determined. According to at least one embodiment, if the strict ordering scheme that will be used is arbitrary (e.g., based on name or pointer value), the ordering criterion may include fetching the names or pointer values.

According to at least one other embodiment, if processing cost estimates are used to determine strict node order, the processing cost for each node in the graph may be estimated. Node processing costs may be estimated based on, for example, the number of circuit elements within the net (i.e., wire connections between elements) represented by a node and may include the node's share of the cumulative cost of processing all downstream nodes.

According to yet another embodiment, if the criticality of each node is used to determine strict node order, the criticality of each node in the graph may be determined. Node criticality may be determined, for example, by performing a preliminary analysis of the network. The preliminary analysis of the network may include a timing analysis of the network without noise and then making a rough estimate using noise.

Then, at 214 the nodes in the graph may be assigned a strict node order. According to at least one embodiment, the node ordering process 200 may then augment the partial ordering to provide a strict (i.e., complete) ordering for all nodes in the graph. In order to resolve ambiguities resulting from partial node order (i.e., break ties between nodes), an arbitrary scheme may be employed such as using the name or pointer value for the nodes to resolve ambiguities based on the determined criterion from 212. For example, a pointer value associated with a node may be associated with a memory address. The memory addresses associated with the each ambiguous node in a pair of ambiguous nodes may be compared and the node having the smaller memory address value may be ordered before the other ambiguous node having a larger memory address value.

According to at least one other embodiment, strict ordering may be implemented based on the processing cost of the ambiguous nodes. Once node processing cost is estimated (i.e., at 212), conflicting nodes may be ordered by processing the largest cost node first, ordering the largest cost node last, or a mix of both approaches. Processing the conflicting node having the largest cost first may be done to reduce the likelihood of threads running out of work to do. The node having the largest processing cost may be ordered to be processed last in order to use the most up-to-date (i.e., least stale) information for the node having the most dependencies. In a mixed approach, ordering the node having the largest cost first or last may depend on the number of threads and nodes (average available parallelism), the importance of getting the most accurate answers and whether there may be iteration. For example, if there may be iteration, processing the largest cost node last may be more efficient as the largest cost node may not consume more resources by being reprocessed. Additionally, another mixed approach may specify that the largest cost node having a processing cost below a predetermined threshold may be processed first and if the processing cost exceeds the predetermined threshold, the largest cost node may be processed last.

According to yet another embodiment, strict ordering may be implemented by resolving conflicts based on the criticality of the node. Based on the preliminary analysis performed at 212, nodes may be identified that may be close to being critical (i.e., close to having zero slack). Nodes that are close to being critical may be processed last since critical nodes may need the most up-to-date (i.e., least stale) information.

Figure 3:
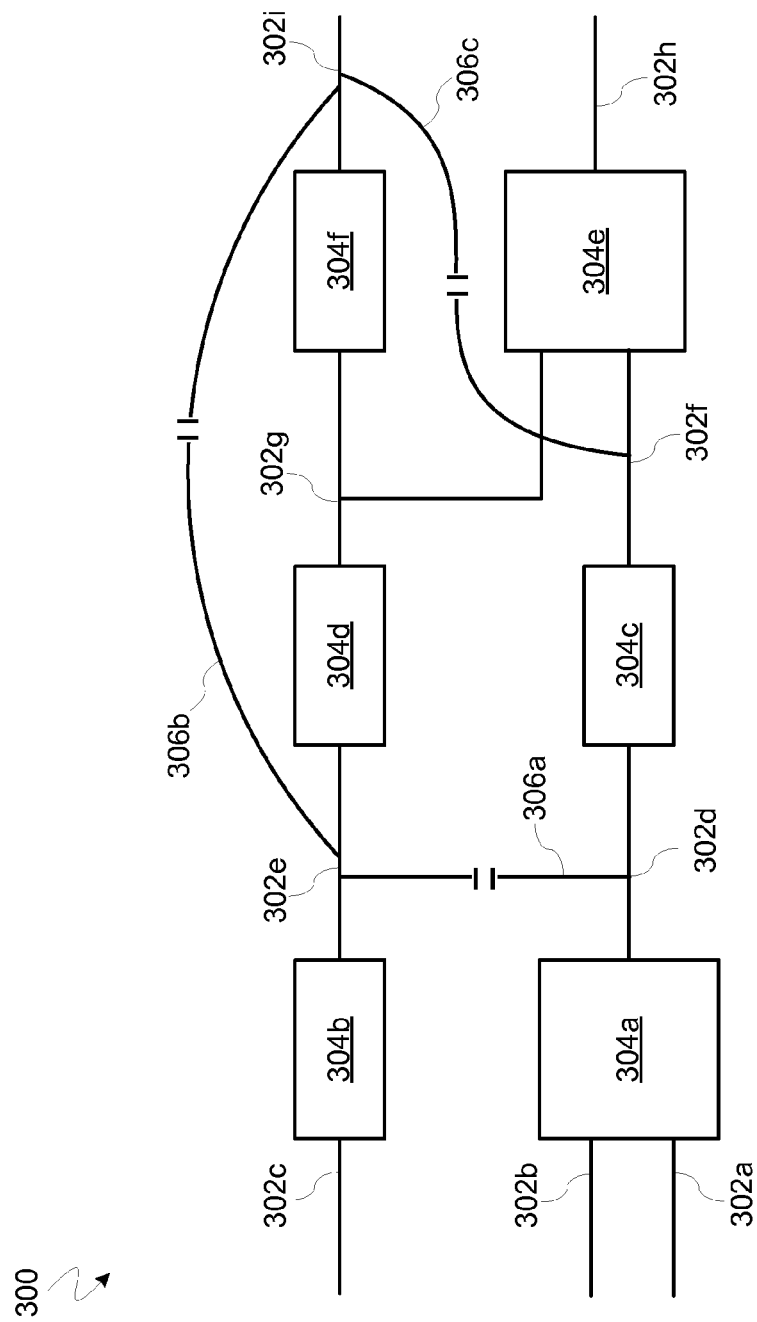
FIG. 3 illustrates an example cell network according to at least one embodiment.

Referring now to FIG. 3, an example cell network 300 is depicted. The cell network 300 includes multiple nets 302a-i, cells 304a-f and coupling capacitors 306a-c.

Figure 4:
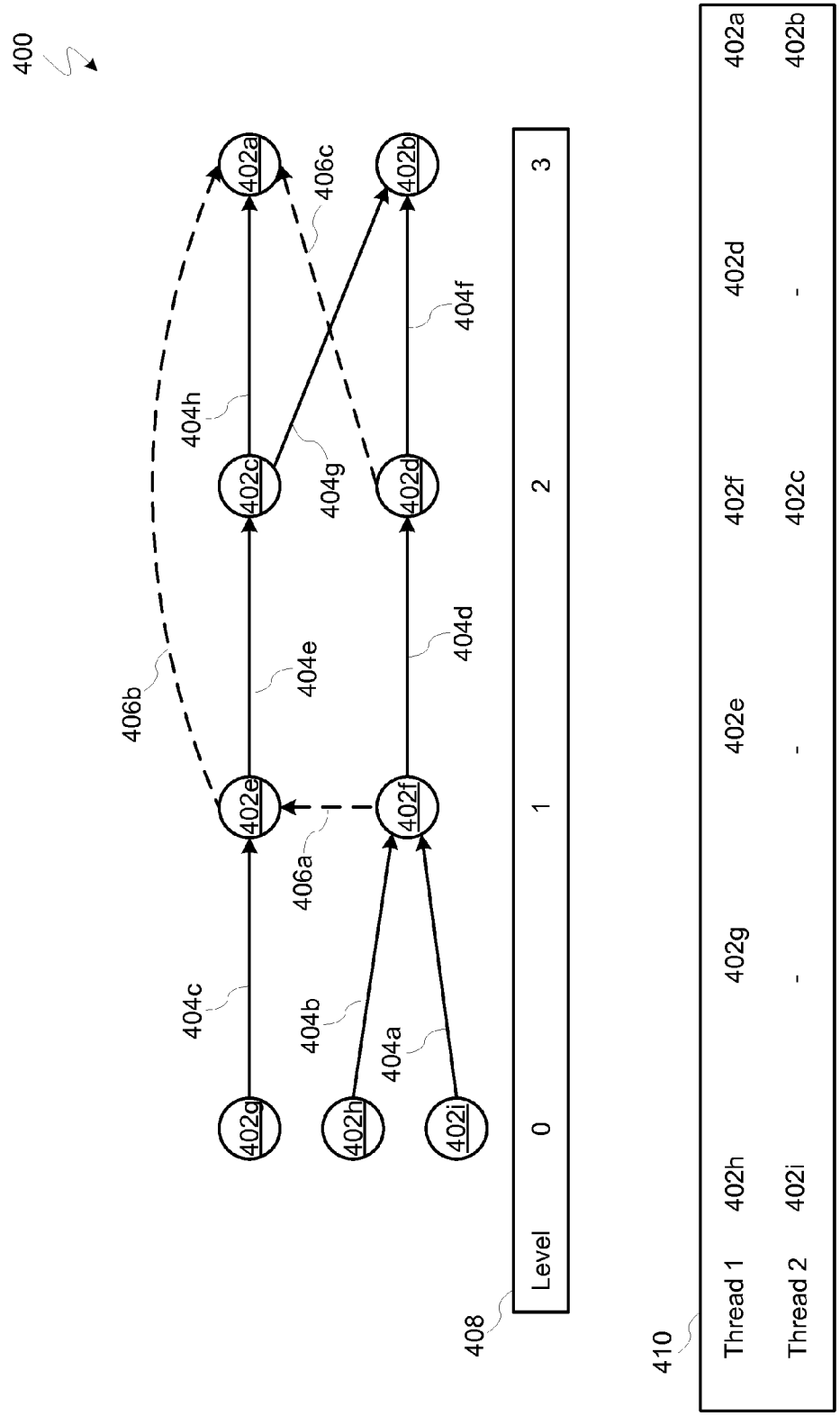
FIG. 4 illustrates an example strictly ordered graph based on arbitrary ordering according to at least one embodiment.

Referring now to FIG. 4, an example of a first strictly ordered graph 400 based on the cell network 300 (FIG. 3) is depicted. A mixed graph (i.e., graph with directed edges and undirected edges) is first generated based on the cell network 300 (FIG. 3) containing a graph node 402a-i for each net 302a-i (FIG. 3). Cell 304a-f (FIG. 3) input/output (I/O) connections from the cell network 300 (FIG. 3) are represented in the graph as directed edges 404a-h (i.e., ordering constraints). Additionally, the coupling capacitors 306a-c (FIG. 3) are represented as conflict edges 406a-c. Utilizing a levelization scheme as described above previously, levels 408 may be assigned to the nodes in the graph. After partial ordering using levelization, some conflict edges may remain unordered (i.e., undirected) such as conflict edge 406a. Levelization would not order conflict edge 406a since the nodes (i.e., nodes 402e and 402o at each end of the conflict edge 406a have the same level value (i.e., level 1). Therefore, a strict ordering scheme (i.e., 214: FIG. 2B), such as arbitrarily ordering the nodes based on node name, is used to transform the mixed graph into the first strictly ordered graph 400 as depicted by assigning a direction to the final undirected conflict edge 406a. With all edges having an assigned direction and no loops within the graph, the first strictly ordered graph 400 would also have the qualities of a directed acyclic graph.

Based on the first strictly ordered graph 400, a possible first processing order 410 for the nodes 402a-i distributed among two threads may be generated. Given the first strictly ordered graph 400, nodes 402h and 402i may be processed by the two threads since both nodes have no predecessor nodes that are not ready (since the nodes have no predecessor nodes). After processing nodes 402h and 402i, node 402g would be processed by thread 1 (since node 402g has no predecessor nodes and therefore no predecessor nodes that are not ready), however node 402f would not be processed by thread 2 due to a conflict in the node order with node 402e. In other words, node 402f has predecessor nodes that are not ready for processing (i.e., node 402e) due to the order of the conflict edge 406a and thus thread 2 would be idle. After thread 1 finishes processing node 402g, thread 1 would process node 402e as node 402g, the predecessor node for node 402e, was processed and ready. After 402e is processed, 402f could then be processed, since all predecessor nodes to node 402f are ready and the conflict with node 402e was resolved. Thread 2 would then process node 402c. Thread 1 would process node 402d and due to a conflict between node 402d and 402a, 402a would not be processed leaving thread 2 idle. Finally, thread 1 would process node 402a and thread 2 would process 402b. Due to unresolved conflicts, the first processing order 410 leaves thread 2 idle for three steps and takes six steps to complete.

Figure 5:
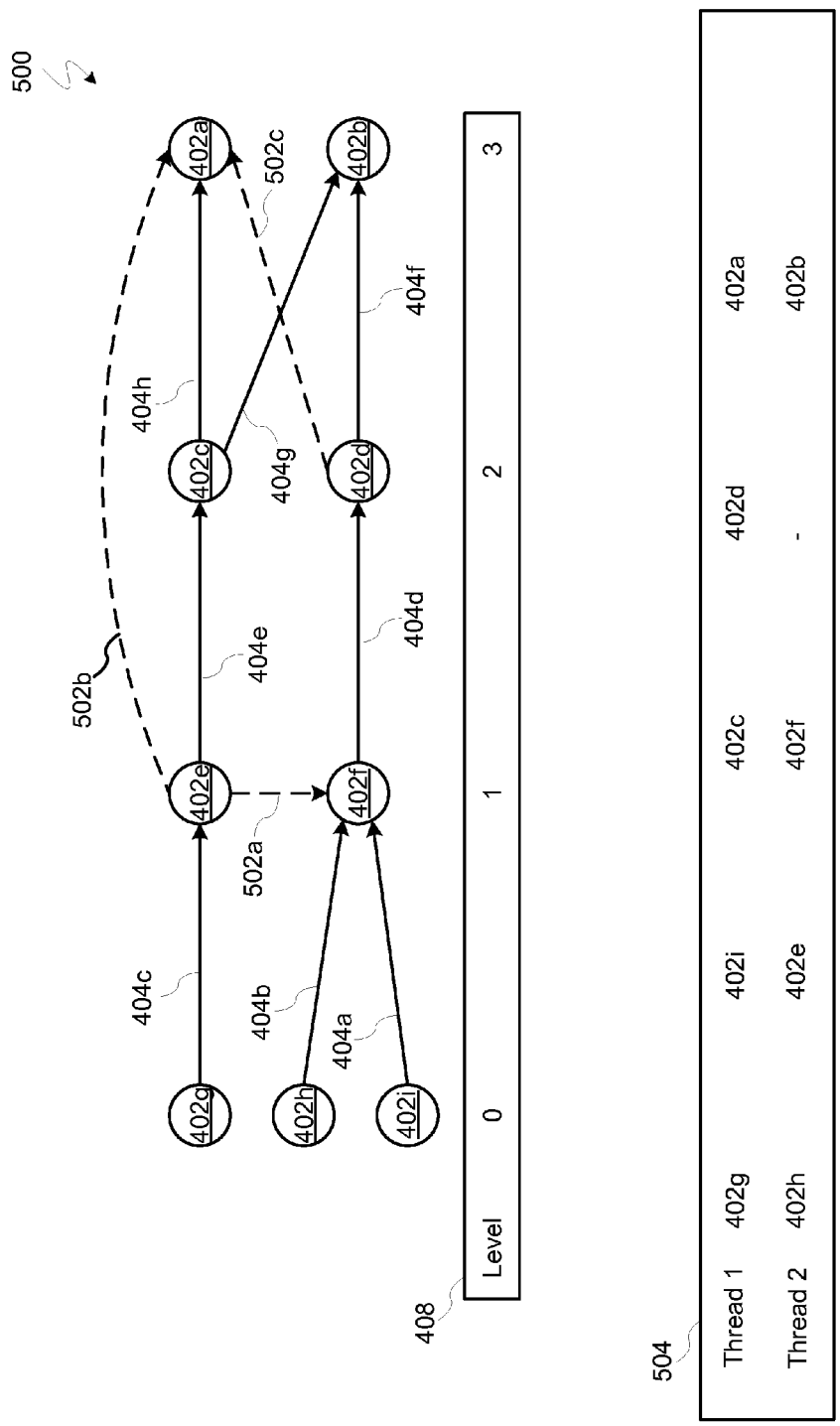
FIG. 5 illustrates an example strictly ordered graph based on cost estimate according to at least one embodiment.

Referring now to FIG. 5, an example of a second strictly ordered graph 500 based on cost estimate ordering is depicted. The second strictly ordered graph 500 is generated from the mixed graph described above where the undirected conflict edges have been assigned a direction. The undirected conflict edges are assigned a direction as described above using levelization for partial node ordering (i.e., 210: FIG. 2B).

Some undirected conflict edges may be assigned a direction based on partial node ordering. The undirected conflict edges spanning between nodes 402e and 402a, and nodes 402e and 402a are assigned different level numbers based on the levelization partial node ordering scheme (level 1 and level 3 respectively). Thus, the direction given to the undirected conflict edge between nodes 402e and 402a would be from the node with the lower level number (i.e., node 402e at level 1) to the node with the higher level number (i.e., node 402a at level 3). Resulting in conflict edge 502b starting at node 402e and ending at node 402a. The resulting direction for the conflict edge 502b prevents formation of a loop that would occur if the direction had been reversed (e.g., starting from node 402a and ending at node 402e).

Similarly, the undirected conflict edge that spans between nodes 402d and 402a would be assigned a direction from node 402d to node 402a since node 402d has a level number of 2 and node 402a has a level number of 3. The resulting conflict edge 502c would start at node 402d and end at node 402*a*. In other words, node 402*a* would depend on node 402*d* and therefore 402*d* must be processed before node 402*a*.

After partial node ordering (i.e., 210: FIG. 2B), the ordering criterion for the strict order scheme to be used is then determined (i.e., 212: FIG. 2B). Given an estimate of processing cost strict ordering scheme, the cost of processing each node is estimated. Then the unresolved conflicts (i.e., the conflict edge between nodes 402*e* and 402*f*) are determined based on the processing cost estimate for the nodes at the ends of the conflict edge. In the depicted example, node 402*e* would precede 402*f* based on estimating the cost of processing. Therefore, the undirected conflict edge between nodes 402*e* and 402*f* would become conflict edge 502*a* having a direction starting from node 402*e* and ending at node 402*f*. In other words, 402*f* would depend on node 402*e* and thus node 402*e* would be ordered for processing before node 402*f* satisfying the conflict constraint. After giving a direction to all edges of the mixed graph, and ensuring that no new cycles have been created, the resulting second strictly ordered graph 500 also has the qualities of a directed acyclic graph.

Based on the second strictly ordered graph 500, the possible second processing order 504 using two threads may begin with thread 1 processing node 402*g* and thread 2 processing node 402*h* at the first step. At the second step, thread 1 may process node 402*i* and thread 2 may process node 402*e*. At the third step thread 1 may process node 402*c* and thread 2 may process 402*f*. Then, at step four, thread 1 may process 402*d* and thread 2 may be idle. Out of the remaining nodes (i.e., node 402*a* and node 402*b*) neither node has all node predecessors ready (i.e., already processed) and thus thread 2 would have no node to process and would be idle. Finally, at step five, thread 1 may process node 402*a* and thread 2 may process node 402*b* since node 402*d* was processed at the previous step, resulting in all predecessor nodes to nodes 402*a* and 402*b* being ready. Thus, all nodes 402*a-i* in the second strictly ordered graph 500 may be processed in five steps with a single thread that was idle for one step (i.e., thread 2 at step four).

It may be appreciated that FIGS. 2A, 2B, 3, 4 and 5 provide only an illustration of a few embodiments and does not imply any limitations with regard to how different embodiments may be implemented. The depicted embodiments describe applications relating to circuit analysis, however the process described above may apply to various other domains. Many modifications to the depicted embodiment(s) may be made based on design and implementation requirements.

Figure 6:
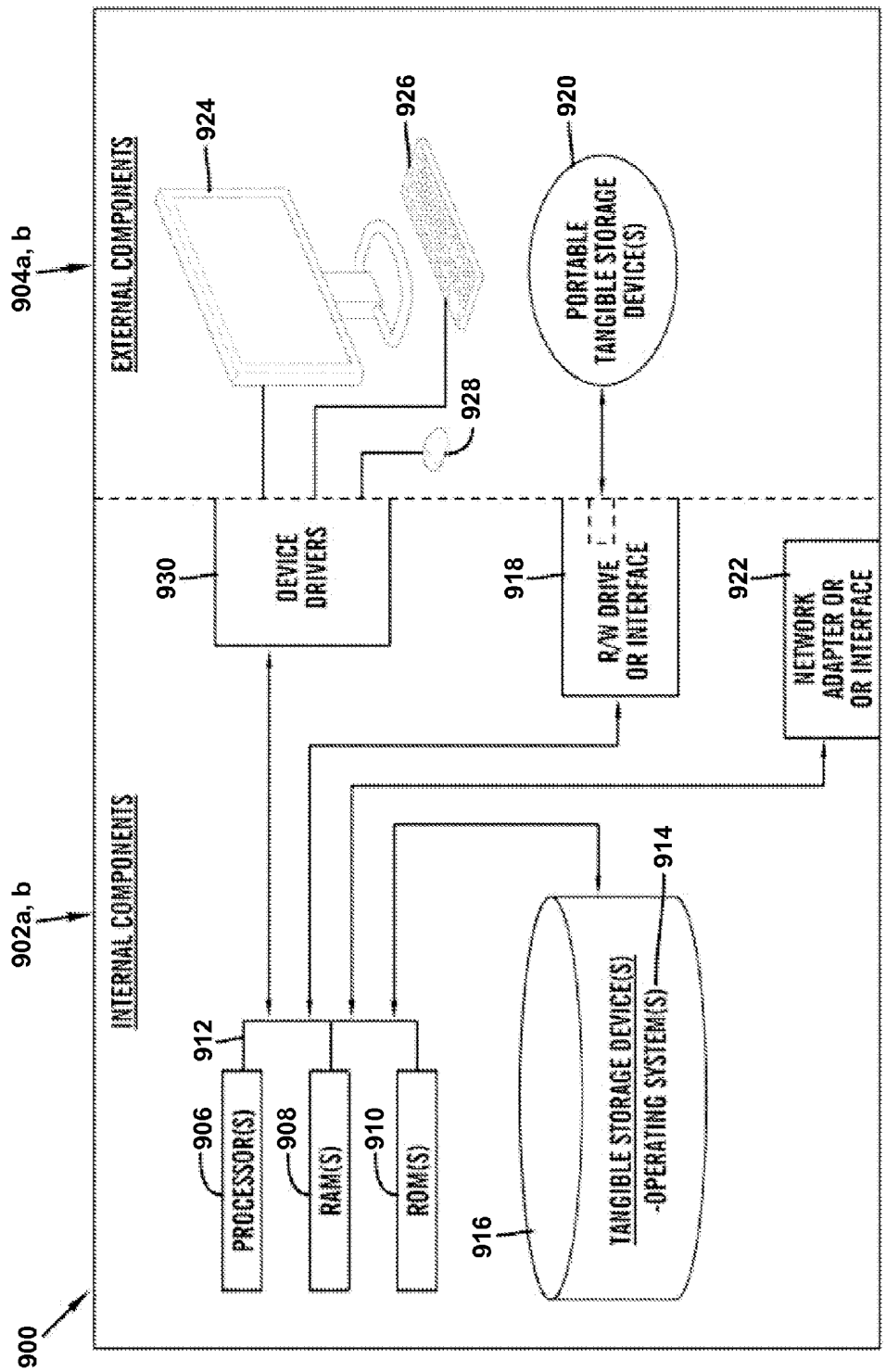
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 110 (FIG. 1) may include respective sets of internal components 902 *a, b* and external components 904 *a, b* illustrated in FIG. 6. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and programs such as a network parallel processing program 108*a* and 108*b* (FIG. 1), may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. The network parallel processing program 108*a* and 108*b* (FIG. 1) can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The network parallel processing program 108*a* (FIG. 1) in client computer 102 (FIG. 1) and the network parallel processing program 108*b* (FIG. 1) in network server computer 110 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the network parallel processing program 108*a* (FIG. 1) in client computer 102 (FIG. 1) and the network parallel processing program 108*b* (FIG. 1) in network server computer 110 (FIG. 1) are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
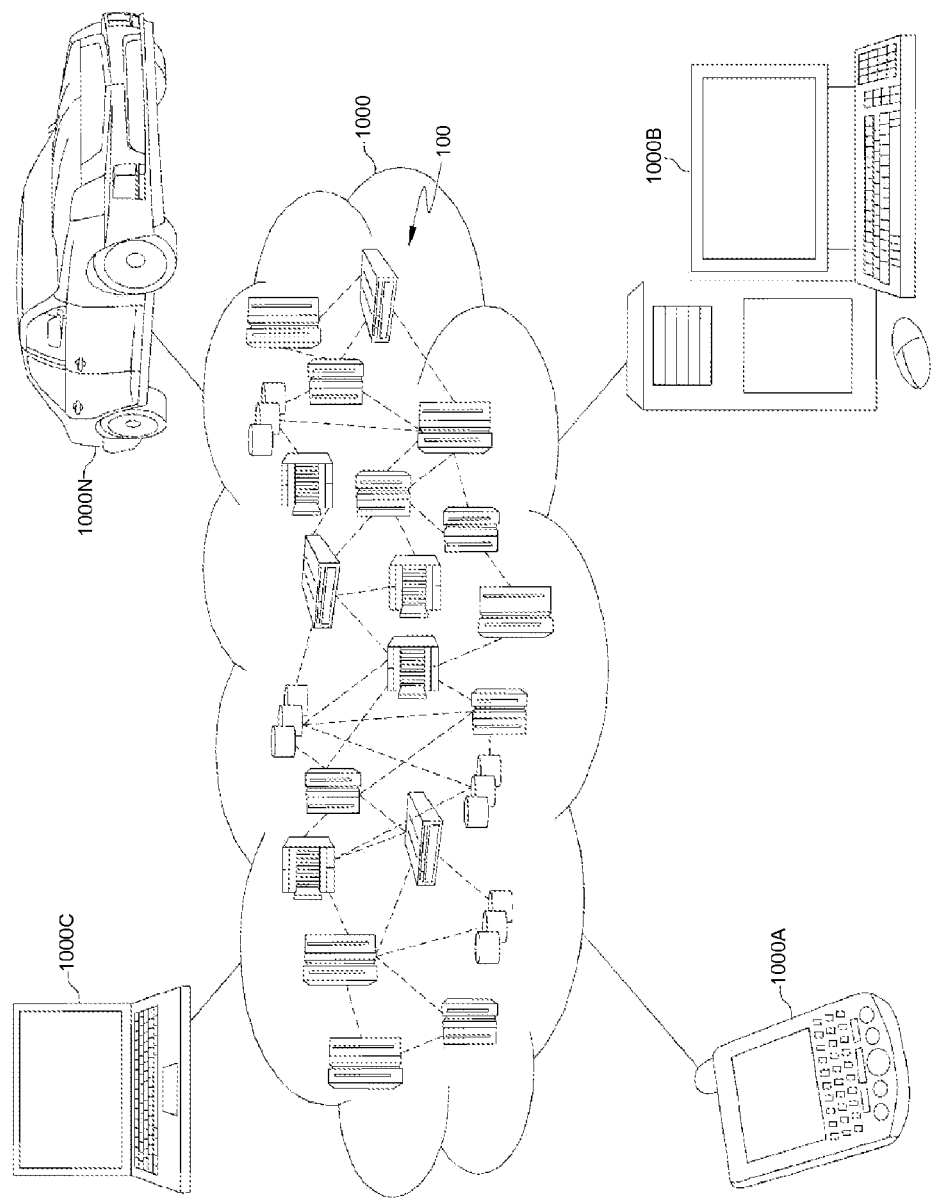
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
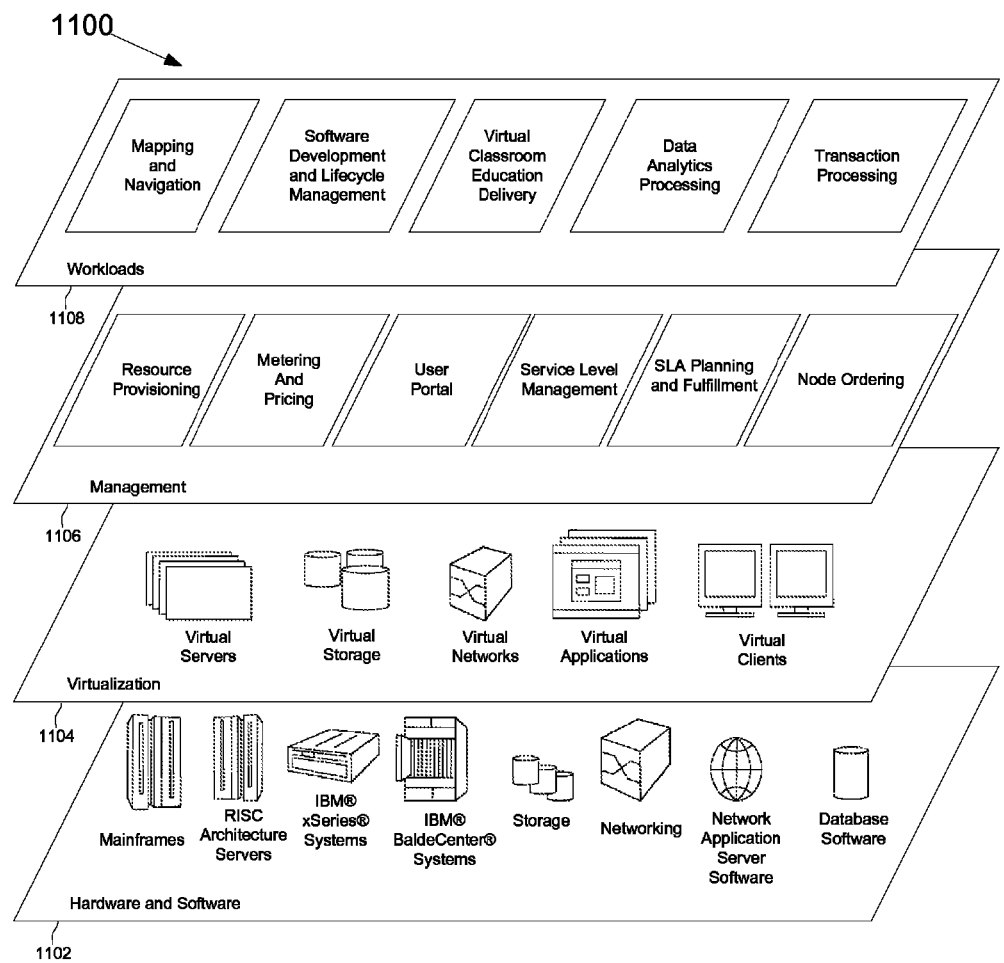
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1102 includes hardware and software components. Examples of hardware components include: mainframes; RISC (Reduced Instruction Set Computer) architecture based servers; storage devices; networks and networking components. In some embodiments, software components include network application server software.

Virtualization layer 1104 provides an abstraction layer from which the following examples of virtual entities may be provided: virtual servers; virtual storage; virtual networks, including virtual private networks; virtual applications and operating systems; and virtual clients.

In one example, management layer 1106 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Node ordering provides a way to efficiently resolve conflicts while ordering nodes within a graph.

Workloads layer 1108 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for parallel processing a network of nodes having at least one ordering constraint and at least one conflict constraint, the method comprising:
    breaking a plurality of loops caused by the at least one ordering constraint;
    determining a node order based on the at least one ordering constraint;
    determining a conflict order based on the at least one conflict constraint, wherein no new loops are created in the network; and
    performing parallel processing of the network of nodes based on the node order and the conflict order.

2. The method of claim 1, wherein the parallel processing comprises noise analysis of an electronic network.

3. The method of claim 2, wherein the at least one conflict constraint comprises a coupling between a pair of nets.

4. The method of claim 1, wherein the conflict order comprises determining an estimated processing cost for an endpoint node associated with the at least one conflict constraint.

5. The method of claim 4, wherein the estimated processing cost comprises an apportioned processing cost of a plurality of downstream nodes and wherein the plurality of downstream nodes are downstream of the endpoint node.

6. The method of claim 1, wherein the conflict order comprises determining a criticality value for an endpoint node associated with the at least one conflict constraint.

7. The method of claim 1, wherein the node order comprises a partial node order and a strict node order and wherein the strict node order is based on the partial node order.

8. A computer system for parallel processing a network of nodes having at least one ordering constraint and at least one conflict constraint, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    breaking a plurality of loops caused by the at least one ordering constraint;
    determining a node order based on the at least one ordering constraint;
    determining a conflict order based on the at least one conflict constraint, wherein no new loops are created in the network; and
    performing parallel processing of the network of nodes based on the node order and the conflict order.

9. The computer system of claim 8, wherein the parallel processing comprises noise analysis of an electronic network.

10. The computer system of claim 9, wherein the at least one conflict constraint comprises a coupling between a pair of nets.

11. The computer system of claim 8, wherein the conflict order comprises determining an estimated processing cost for an endpoint node associated with the at least one conflict constraint.

12. The computer system of claim 11, wherein the estimated processing cost comprises an apportioned processing cost of a plurality of downstream nodes and wherein the plurality of downstream nodes are downstream of the endpoint node.

13. The computer system of claim 8, wherein the conflict order comprises determining a criticality value for an endpoint node associated with the at least one conflict constraint.

14. The computer system of claim 8, wherein the node order comprises a partial node order and a strict node order and wherein the strict node order is based on the partial node order.

15. A computer program product for parallel processing a network of nodes having at least one ordering constraint and at least one conflict constraint, comprising:
    one or more computer-readable storage medium and program instructions stored on at least one of the one or more tangible storage medium, the program instructions executable by a processor, the program instructions comprising:

program instructions to break a plurality of loops caused by the at least one ordering constraint;

program instructions to determine a node order based on the at least one ordering constraint;

program instructions to determine a conflict order based on the at least one conflict constraint, wherein no new loops are created in the network; and program instructions to perform parallel processing of the network of nodes based on the node order and the conflict order.

16. The computer program product of claim 15, wherein the parallel processing comprises noise analysis of an electronic network.

17. The computer program product of claim 16, wherein the at least one conflict constraint comprises a coupling between a pair of nets.

18. The computer program product of claim 15, wherein the conflict order comprises determining an estimated processing cost for an endpoint node associated with the at least one conflict constraint.

19. The computer program product of claim 18, wherein the estimated processing cost comprises an apportioned processing cost of a plurality of downstream nodes and wherein the plurality of downstream nodes are downstream of the endpoint node.

20. The computer program product of claim 15, wherein the conflict order comprises determining a criticality value for an endpoint node associated with the at least one conflict constraint.

* * * * *